United States Patent Office 3,306,640
Patented Feb. 28, 1967

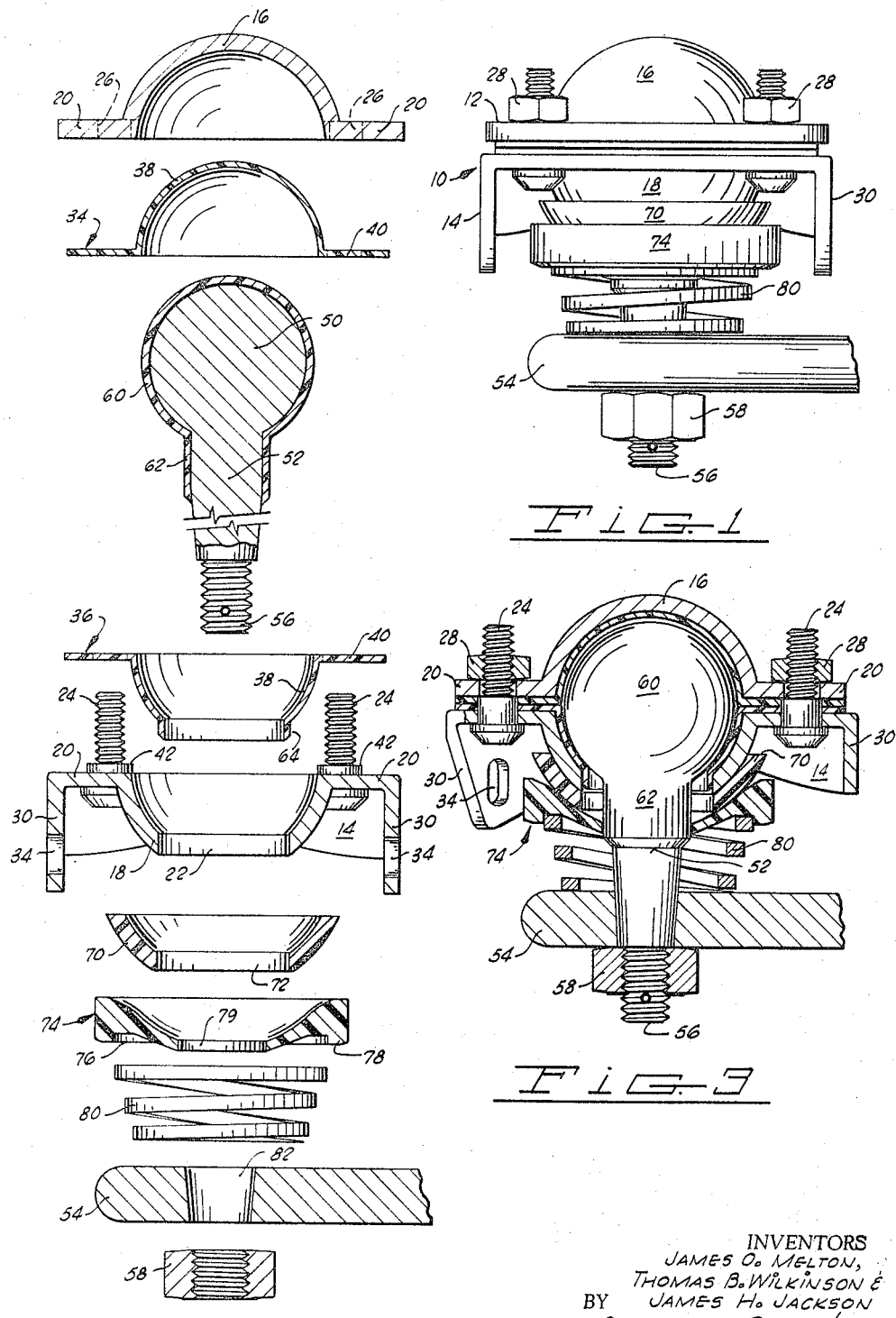

3,306,640
BALL AND SOCKET JOINT
James O. Melton, 1208 Cruce St., Norman, Okla. 73069;
Thomas B. Wilkinson, 5925 S. Eggleston, Oklahoma
City, Okla. 73109; and James H. Jackson, 1730 N.
Shawnee, Oklahoma City, Okla. 73107
Filed Jan. 21, 1963, Ser. No. 252,669
10 Claims. (Cl. 287—90)

This invention relates to ball and socket joints and more particularly, to ball and socket joints in which at least one bearing is provided in which the contacting bearing surfaces are constructed of high density, synthetic resin materials.

In application for United States Letters Patent Serial No. 240,524, filed November 28, 1962, now Patent No. 3,149,863, and assigned to the assignee of the present invention, an improved ball and socket joint is disclosed in which the properties of high density, synthetic resin plastics were employed to permit an improvement in the ease with which the relatively moving members connected to each other through the joint might be moved, and to improve the economy with which such joints might be constructed. The present invention provides further improvements in ball and socket joints of the type which utilize a high density, synthetic resin material as at least one, and preferably both, of the bearing surfaces at each of the bearing interfaces in the joint. The invention provides improvements in joints of the type mentioned which permit the joint to perform without defect or malfunction for longer periods of time and which generally decrease the resistance to turning offered by such joints. The ball and socket joints of the invention are particularly well-adapted for use in the front end suspension systems of automobiles where ease of turning, long and trouble-free service life and reduction or elimination of lubrication are important factors in the performance and general value of the ball and socket joints.

Broadly, the present invention is a ball and socket joint comprising a generally spherical, metallic socket which has formed in one side thereof, a circular aperture through which is passed the spindle or shank of a ball member contained within the metallic socket. The metallic socket is lined with a high density, synthetic resin material and the ball member inside the metallic socket is sheathed in a high density synthetic resin. The sheath around the ball member is projected or extended for some distance along the spindle which is secured to the ball member. In a preferred embodiment of the invention, the high density, synthetic resin material which is used to line the generally spherical, metallic socket is of a dissimilar molecular structure from the synthetic resin used to sheath the ball member within the socket since, for reasons hereinafter explained in greater detail, we have found that this arrangement results in a freer turning joint than that which results where identical plastics are used in these two elements of the assembly. Also, it is preferred to provide a synthetic resin sealing and bearing means outside the generally spherical metallic socket and fitting tightly around the sheath of synthetic resin extending down the spindle of the ball member so that such synthetic resin sealing and bearing means tightly seals the interior of the metallic socket against the infiltration of deleterious materials such as dust, mud, water and motor sludge.

From the foregoing general description of the invention, it will become apparent that a major object of the present invention is to provide a ball and socket joint which offers little resistance to the relative turning movement of the two members which it is used to interconnect, and which is characterized by a long and trouble-free operating life.

Another object of the invention is to provide a ball and socket joint which does not require lubrication during its service life.

An additional object of the invention is to provide a ball and socket joint, the parts or elements of which may be easily individually replaced or repaired if they become damaged through excessively abusive use.

A further object of the present invention is to provide a ball and socket joint, the interior and bearing surfaces of which are well-protected against the infiltration of deleterious materials from outside the joint.

Additional objects and advantages of the invention will become apparent from the following detailed description of the invention when such detailed description is read in conjunction with a perusal of the accompanying drawings which illustrate our invention.

In the drawings:

FIGURE 1 is one embodiment of the ball and socket joint of the present invention as it appears when assembled.

FIGURE 2 is an exploded sectional view of the ball and socket joint shown in FIGURE 1.

FIGURE 3 is a vertical, sectional view through the ball and socket joint shown in FIGURE 1 with the section through the joint taken through the bolts or projections used to hold the joint together after the joint, as shown in FIGURE 1, has been rotated 45° about a vertical axis taken through the center of the joint and lying in the plane of the paper upon which the drawing is made.

Referring now to the drawings in detail, reference character 10 generally designates a metallic socket member which is made up of an upper part 12 and a lower part 14. Both the upper and lower parts, 12 and 14 respectively, are characterized in having hemispherical central portions 16 and 18, respectively, which hemispherical central portions are provided with flanges 20 which extend normal to the axes of the hemispherical portions 16 and 18 as best illustrated in FIGURE 2. The hemispherical portion 18 of the lower part 14 of the metallic socket member 10 is provided with a circular aperture 22 therethrough.

Projecting upwardly from the flange 20 of the lower part 14 are a pair of threaded projections or bolts 24 which pass through apertures 26 formed in the flange 20 of the upper part 12. The central, hemispherical portions 16 and 18 of the upper and lower parts, 12 and 14 respectively, are aligned to form a hollow, generally spherical body. The upper and lower parts 12 and 14 are secured together by means of the threaded nuts 28 which are threaded upon the projections 24 as shown in FIGURES 1 and 3.

To facilitate the attachment of the metallic socket member 10 to two oppositely moving members which it is desired to interconnect by means of a ball and socket joint, a downwardly depending flange 30 is provided which extends substantially normal to the flange 20 of the lower part 14 of the metallic socket member. In the embodiment of the invention illustrated in the drawings, the ball and socket joint is adapted by the flange 30 for attachment to the upper control arm of the front end suspension system of automobiles. To this end the flange 30 is provided with apertures 34 for the accommodation of fastening bolts (not shown).

For the purpose of providing a lining of high density, synthetic resin inside the hollow metallic socket member 10, a pair of complementary high density, synthetic resin liners 34 and 36 are provided which conform substantially in configuration to the upper part 12 and the lower part 14, respectively, of the metallic socket 10. It will be noted that each of the high density, synthetic resin liners 34 and 36 comprise a hemispherical portion 38 and a flange portion 40 which, when the joint is assembled, mate with the corresponding elements of the respective upper and lower parts 12 and 14 of the metallic socket 10 (see FIGURE 3). It will further be noted in referring to FIGURES 2 and 3 that the threaded projections 24 are each provided with an abutment or shoulder 42 which is slightly less in axial thickness than the combined or total thicknesses of the flanges 40 of the two high density, synthetic resin liners 34 and 36. The diameter of each of the shuolders 42 is greater than the diameter of the apertures 26 in the metallic flange 20 of the upper part 12 so that this flange cannot be biased toward the metallic flange 20 of the lower part 14 further than is permitted by the shoulders 42. The purpose of this construction is to permit the nuts 28 to be tightened by a sufficient amount to place the resin flanges 40 of the liners 34 and 36 in compression so as to afford a tight seal between the contacting surfaces of the flanges of the liners, but to prevent excessive loading of the resin material so as to lead to fracture or early deterioration. In a preferred embodiment of the invention, the flanges 40 of the synthetic resin liners 34 and 36 are each about 0.03 of an inch in thickness whereas the shoulders 42 of the threaded projections 24 are each about 0.04 of an inch in thickness. The flanges 40 on the two liners 34 and 36 can therefore each be compressed about 0.01 of an inch before further compression is prevented by abutment of the metallic flange 20 of the upper part 12 against the shoulders 42.

Positioned inside the metallic socket member 10 is a metallic ball member 50. The ball member has secured thereto an elongated spindle or stud 52 which extends through the aperture 22 in the metallic socket member 10 and may be utilized to interconnect a first relatively moving member which is secured to the socket member 10 to a second member 54 as shown in FIGURES 1 and 3 of the drawings. To this end, the lower end 56 of the spindle 52 is threaded and receives a locknut 58 after it has been passed through an aperture in the member 54.

The ball member 50 is completely surrounded or covered by a sheath 60 of high density, synthetic resin. The sheath 60 carries a tubular portion 62 which covers the spindle 52 over a portion of its length. The extent to which the spindle 52 is covered by the tubular portion 62 of the sheath 60 is described in greater detail hereinafter. It is important to note in referring to FIGURES 2 and 3 that the lowermost synthetic resin liner 36 is provided with a shank portion 64 which projects into the aperture 22 in the lower part 14 of the metallic socket 10 and provides a lining for this aperture to prevent contact between the metal of the socket member 10 and the tubular portion 62 of the sheath 60. It should also be pointed out that the aperture 22 is of considerably larger diameter than the spindle 52 and its associated tubular sheath portion 62 so that the ball member 50 may undergo a limited amount of oscillation within the resin lined metallic socket 10.

Positioned outside the metallic socket member 10 and around the sheathed portion of the spindle 52 is a synthetic resin bearing means which includes a frusto-spherical member 70 and a thrust washer 74. The frusto-spherical member 70 is provided with an opening 72 therethrough which is about the same size as the opening 22 through the lower part 14 of the metallic socket member 10. The thrust washer 74 has an internal peripheral surface which is curved or arcuate so as to bear substantially tangentially against the external peripheral surface of the frusto-spherical member 70. At its lower side, the thrust washer 74 is provided with a circumferential groove 76 which is defined or enclosed by an axially extending flange or projection 78. An opening 79 is provided through the thrust washer 74 to receive the sheathed portion of the spindle 52, and the opening 79 is dimensioned to provide a sealing fit of the thrust washer around the tubular portion 72 of the sheath 60. This arrangement of the thrust washer 74 relative to the tubular portion 62 of the sheath 60 may best be perceived by reference to FIGURE 3 of the drawings.

A resilient member, such as the helical spring 80, is interposed between the thrust washer 74 and the member 54 which is to be interconnected to another relatively moving member by the ball joint of the invention. The helical spring 80 is preferably tapered from its upper end to its lower end and is of a diametric dimension at its uppermost convolution so that it must be slightly compressed in a radial direction to fit in the groove 76 formed in the thrust washer 74. It will be observed that the spindle 52 is tapered toward its lower end so that a mating tapered aperture 82 through the member 54 may be engaged to prevent the member 54 from moving up the spindle beyond a certain point.

*Operation*

Having described the various elements of the ball and socket joint of the present invention and the manner in which they are assembled relative to each other, the operation and advantageous features of the joint will now be discussed. With the joint assembled in the manner shown in FIGURES 1 and 3, the member 54 may be moved relative to a second member (not shown) which is connected to the metallic socket member 10 through the apertures 34 provided in the lower part 14. The member 54 may move in rotation about the axis of the spindle 52, or it may oscillate about various axes all lying in a plane extending normal to the paper upon which the drawing is made and passing through the center of the ball or spherical member 50. In neither of these movements, metal to metal contact at the bearing surfaces provided is entirely obviated by the present invention. Further than this, the invention contemplates the use in every pair of bearing surfaces of two high density, synthetic resin materials. Thus, whether the member 54 is rotated or oscillated relative to the member secured to the metallic socket 10, the movement of the ball member 50 within the metallic housing results in movement of its resin sheath 60 against the abutting and complementary surface of the resin liners 34 and 36. It is contemplated that the resin materials of construction of the sheath 60 and the resin liners 34 and 36 shall in each case be materials having a low coefficient of friction since, as hereinafter explained, it is not required to supply lubricant to the interior of the joint during its operating life.

In a preferred construction of the joint of the invention, the high density synthetic resins which are used in each pair of bearing surfaces are constructed of materials having a different molecular structure. We have found that considerable advantage is derived from such construction over that which can be obtained when identical plastic materials are utilized in the two surfaces in that interpolymerization of the resin bearing surfaces is thereby avoided when the joint is subjected to high temperatures and pressures as a result of extreme operating conditions. Materials which we have found especially effective for the described purpose include long chain polyamides, such as those sold under the trade name nylon, high density polyethylene, such as that sold under the trade name Marlex, and polyhalohydrocarbons, such as those sold under the trade names of Teflon and Kel-F. A highly satisfactory and efficient joint has been fabricated using nylon as the resin of which the sheath 60 and its tubular portion 62 are constructed and high density polyethylene as the material of which the resin liners 34 and 36 are constructed.

The second bearing which is employed in the ball and socket joint of the invention is formed by the contacting surfaces of the frusto-spherical member 70 and the thrust washer 74. The area of contact between these two members is reduced by virtue of the lesser radius of curvature of the inner surface of the thrust washer 74 than the external peripheral surface of the frusto-spherical member 70. As the member 54 is rotated or oscillated relative to the member to which it is connected through the metallic socket 10, the thrust washer 74 is urged into movement by contact with the spring 80 and by virtue of its close fit with the tubular portion 62 of the sheath 60. The frusto-spherical member 70, on the other hand, is retained stationary relative to the metallic socket 10 so that a sliding movement of the thrust washer across the external peripheral surface of the frusto-spherical member 70 occurs.

For the reasons hereinbefore described, We prefer to construct the frusto-spherical member 70 and the thrust washer 74 of two high density synthetic resins having differing molecular structures. Suitable materials have been suggested above.

Ingress to the interior of the ball and socket joint of the invention by deleterious materials is prevented by the sealing fit of the thrust washer 74 with the tubular portion 62 of the sheath 60 and also by the compression of the flange portions 40 of the liners 34 and 36 into sealing engagement with each other. As has previously been explained, the nuts 28 which coact with the threaded projections 24 may be tightened only to a point which compresses the flange portions 40 of the liners 34 and 36 into good sealing engagement with each other. The shoulders 42 on the threaded projections 24 provide assurance that destructive compression of the flanges 40 of the liners 34 and 36 cannot be achieved.

From the foregoing description of the invention, it will be perceived that the present invention provides an improved ball and socket joint which offers a low resistance to relative turning of two members which it interconnects. The joint is structurally strong and characterized by a long and trouble-free operating life. Moreover, during such operating life it is unnecessary to provide lubrication for the joint, and the interior of the joint may therefore be completely sealed against the ingress of deleterious materials, such as dust, mud, water and motor sludge.

Although certain modifications and innovations in the structure hereinbefore disclosed by way of example will occur to those skilled in the art, such modifications and innovations are intended to be encompassed within the spirit and scope of the present invention unless they involve a marked departure from the broad principles which underlie the invention.

We claim:
1. A ball and socket joint comprising:
 (a) a metallic socket member having an apertured, generally spherical, hollow portion and adapted for attachment to one of two relatively moving members to be interconnected by said joint;
 (b) high density, synthetic resin lining means lining said generally spherical hollow portion and secured to said socket member against movement relative thereto;
 (c) a ball member enclosed in said hollow portion;
 (d) a spindle projecting from said ball member through the aperture in said spherical hollow portion and connected at its end opposite said ball member to the other of said two relatively moving members; and
 (e) a high density synthetic resin sheath molded around said ball and a portion of said spindle;
 (f) synthetic resin bearing means around the sheath portion of said spindle and outside the generally spherical hollow portion of said metallic socket, said bearing means including a generally frusto-spherical member bearing against the outer periphery of said generally spherical hollow portion, and said bearing means having an aperture therethrough dimensioned to provide a sealing fit between said bearing means and the sheathed portion of said spindle whereby the infiltration of deleterious materials to the interior of said generally cylindrical hollow portion is prevented; and

(g) resilient means between the other of said two relatively moving members and said bearing means and biasing said frusto-spherical member against the outer periphery of said metallic socket.

2. A ball and socket joint as claimed in claim 1 wherein said synthetic resin bearing means around the sheathed portion of said spindle comprises:
 (a) said generally frusto-spherical member, which frusto-spherical member is constructed of a high density, synthetic resin material; and
 (b) a high density, synthetic resin, generally cup-shaped thrust washer interposed between said resilient means and said frusto-spherical member and forming a bearing by contact with the surface of said frusto-spherical member.

3. A ball and socket joint as claimed in claim 2 wherein said generally frusto-spherical member is constructed of a high density synthetic resin which has a different molecular structure from the high density synthetic resin of which said thrust washer is constructed.

4. A ball and socket joint as claimed in claim 1 wherein said lining means is constructed of a high density, synthetic resin which has a different molecular structure from that of the high density synthetic resin of which said sheath is constructed.

5. A ball and socket joint as claimed in claim 4 wherein said sheath is constructed of a long chain polyamide material and said lining means is constructed of a high density polyethylene.

6. A ball and socket joint comprising:
 (a) a generally spherical metallic socket having a circular aperture in one side thereof;
 (b) a high density synthetic resin lining in said socket and lining the generally spherical internal walls thereof, said lining having a tubular shank portion lining the circular aperture through said metallic socket;
 (c) a generally spherical, high density synthetic resin member in said socket; and
 (d) a high density synthetic resin spindle portion molded integrally with said generally spherical resin member and protruding through said shank portion, with a substantial clearance between the external peripheral surface of said spindle portion and said tubular shank portion to permit said spindle portion to be moved in oscillatory motion in a plane containing the axis of said tubular shank portion.

7. A ball and socket joint as claimed in claim 6 wherein said high density synthetic resin lining is constructed of a different high density synthetic resin material from that of which said generally spherical, high density, synthetic resin member is constructed.

8. A ball and socket joint as claimed in claim 6 and further characterized to include synthetic resin sealing means sealingly surrounding said spindle portion outside said metallic socket, said sealing means covering the circular aperture through said metallic socket and bearing against the outer periphery of said metallic socket.

9. A ball and socket joint comprising:
 (a) a metallic socket member including
  (1) an upper part having a hemispherical central portion and having a flange around the free edge of said hemispherical central portion;
  (2) a lower part adapted for attachment to one of two relatively moving members to be interconnected by said joint and having an axially apertured hemispherical central portion and a flange around the free edge of said hemispherical central portion at its end opposite said aperture; and
  (3) means for securing the flanges of said upper and lower parts to each other in superimposed relation with said hemispherical central portions aligned to form an apertured, generally spherical hollow portion;

(b) a pair of high density, synthetic resin complementary liners in said spherical hollow portion and conforming substantially in configuration to the hemispherical central portions of said upper and lower parts, respectively, and each having flanged portions adapted to flatly abut the respective flanges of said upper and lower parts when said liners are each operatively associated with the respective part of said metallic socket to which it conforms in configuration;

(c) a plurality of threaded projections on the flange of one of said parts and positioned thereon for alignment with apertures in the flange of the other part through which said projections pass;

(d) nuts threaded on said projections;

(e) shoulder means on each of said projections positioned to permit limited compression of the flange portions of said complementary resin liners when said nuts are tightened;

(f) a ball member enclosed within said synthetic resin liners;

(g) a spindle projecting from said ball member through the aperture in said spherical hollow portion and adapted for connection at its end opposite said ball member to the other of said two relatively moving members; and (h) a high density synthetic resin sheath molded around said ball member.

10. A ball and socket joint comprising:

(a) a generally spherical metallic socket having an aperture in one side thereof;

(b) a high density synthetic resin lining in said socket and lining the generally spherical internal walls thereof and at least partially lining said aperture;

(c) a spherical metallic ball member in said generally spherical metallic socket;

(d) a spindle projecting from said spherical metallic ball member through the aperture in said spherical metallic socket; and (e) a high density synthetic resin sheath of spherical configuration molded around said spherical metallic member and in contact at all points therewith, said high density synthetic resin sheath further having a portion extending along and surrounding a portion of said spindle.

References Cited by the Examiner

UNITED STATES PATENTS

| | | | |
|---|---|---|---|
| 2,740,649 | 4/1956 | Latzen | 287—87 |
| 2,878,047 | 3/1959 | Booth. | |
| 2,885,235 | 5/1959 | Moskovitz | 287—87 |
| 2,912,267 | 11/1959 | Latzen. | |
| 2,999,709 | 9/1961 | Melton et al. | |
| 3,025,090 | 3/1962 | Langen | 287—87 |
| 3,058,765 | 10/1962 | Thomas. | |
| 3,079,183 | 2/1963 | Melton et al. | 287—90 |
| 3,079,184 | 2/1963 | Melton et al. | 287—90 |
| 3,088,784 | 5/1963 | Melton et al. | 287—90 X |

CARL W. TOMLIN, *Primary Examiner.*

A. V. KUNDRAT, *Assistant Examiner.*